United States Patent
Schrumpf et al.

[11] Patent Number: 5,218,339
[45] Date of Patent: Jun. 8, 1993

[54] ARRANGEMENT FOR MONITORING A CONSUMER IN COMBINATION WITH AN INTERNAL COMBUSTION ENGINE AND/OR A MOTOR VEHICLE

[75] Inventors: Hans Schrumpf, Oberasbach; Georg Haubner, Berg/Oberpfalz, both of Fed. Rep. of Germany

[73] Assignee: Robert Bosch GmbH, Stuttgart, Fed. Rep. of Germany

[21] Appl. No.: 765,953

[22] Filed: Sep. 26, 1991

[30] Foreign Application Priority Data

Sep. 27, 1990 [DE] Fed. Rep. of Germany ....... 4030533

[51] Int. Cl.$^5$ .................. B60Q 1/00; G08B 29/00
[52] U.S. Cl. .................. 340/439; 340/510; 340/500; 340/511; 340/661; 363/136
[58] Field of Search .............. 340/439, 510, 511, 500, 340/501, 506, 650, 649, 657, 661; 363/136

[56] References Cited

U.S. PATENT DOCUMENTS

| | | | |
|---|---|---|---|
| 3,997,890 | 12/1976 | Kendrick, Jr. | 340/510 |
| 4,348,661 | 9/1982 | Lucchesi | 340/510 |
| 4,833,451 | 5/1989 | Lehmann et al. | 340/510 |
| 4,951,188 | 8/1990 | Peter et al. | 363/132 |

FOREIGN PATENT DOCUMENTS 3842426 6/1990 Fed. Rep. of Germany.

*Primary Examiner*—Donnie L. Crosland
*Attorney, Agent, or Firm*—Walter Ottesen

[57] ABSTRACT

An arrangement monitors a consumer in combination with an internal combustion engine or motor vehicle especially for monitoring an electric drive which is driven by an output stage in the form of a bridge circuit. Potentials are compared in the area of the consumer or of the output stage to pregiven threshold values derived from the normal operation. From this comparison, an alarm signal is generated in a time-delayed manner with the time delay being dependent upon the magnitude of the drive signal.

12 Claims, 2 Drawing Sheets

ARRANGEMENT FOR MONITORING A CONSUMER IN COMBINATION WITH AN INTERNAL COMBUSTION ENGINE AND/OR A MOTOR VEHICLE

FIELD OF THE INVENTION

The invention relates to an arrangement for monitoring a consumer in combination with an internal combustion engine and/or a motor vehicle. The arrangement includes an output stage configured as a bridge circuit having at least two power switches. The output stage drives the consumer arranged in the diagonal of the bridge with a drive signal. A monitoring device monitors the operation of the output stage and/or of the consumer and includes a comparator which monitors pregiven potential points in the region of the output stage and/or consumer for prespecified value ranges and determines a fault condition.

BACKGROUND OF THE INVENTION

Such an arrangement is disclosed in U.S. Pat. No. 4,951,188 wherein an electric drive in combination with an internal combustion engine is described. The drive is driven via an output stage configured as a bridge circuit. The output stage is configured as a bridge circuit having four drivable power switches with the electric drive being arranged in the bridge diagonal. The electric drive is controllable in the forward direction as well as in the rearward direction in that in the corresponding switch-on phase one particular bridge diagonal is made conductive. Furthermore, switching means are provided which permit the function of the output stage and electric drive to be monitored with respect to short circuits or shunts and/or overcurrents in the region of the output stage and electric drive.

Monitoring in this manner generates an alarm signal for a fault condition independently of the magnitude of the drive signal. The formation of the alarm signal and the reaction which follows must therefore be designed for the worst possible fault.

SUMMARY OF THE INVENTION

In view of the foregoing, it is an object of the invention to improve a monitoring operation of the kind described above.

This object is realized in that comparison means are provided which compare pregiven potential points in the region of the output stage and consumer (that is, an electric drive) to the values characterizing normal operation during the switch-on phase of the particular power switch. In the case of a fault, an evaluation unit is driven which generates an alarm signal in dependence upon the drive signal magnitude.

In German published patent application DE-OS 3,842,426, a switching arrangement is suggested for monitoring a consumer in combination with an internal combustion engine or a motor vehicle with the consumer being driven by an output stage which is configured as a bridge circuit. For monitoring predetermined potential points in the region of the output stage to a pregiven value range, which is reached in normal operation, evaluation means are provided which, in the case of a fault, generate an alarm signal when there is a drop below a pregiven value range or when this value range is exceeded. There is no provision here for considering the drive signal magnitude.

The arrangement according to the invention for monitoring the output stage affords the advantage that an alarm signal is provided for a fault condition in the region of the output stage in dependence upon the magnitude of the drive signal.

Large drive signal magnitudes can lead to unwanted situations in the preferred areas of application of the operating procedure of the invention in the context of engine control systems. For this reason, the detection of the fault condition is rapid when switching out for example short-term voltage and current peaks.

In contrast, for lesser drive signal magnitudes, shorter disturbances do not lead to a reaction of the system which disturbances would otherwise require a switch-off of the engine or an emergency operation of the vehicle.

The measures described thereby increase reliability and availability of the system.

A further advantage is the favorable cost and simple circuit realization of the concept which can be realized as a hybrid or integrated circuit.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
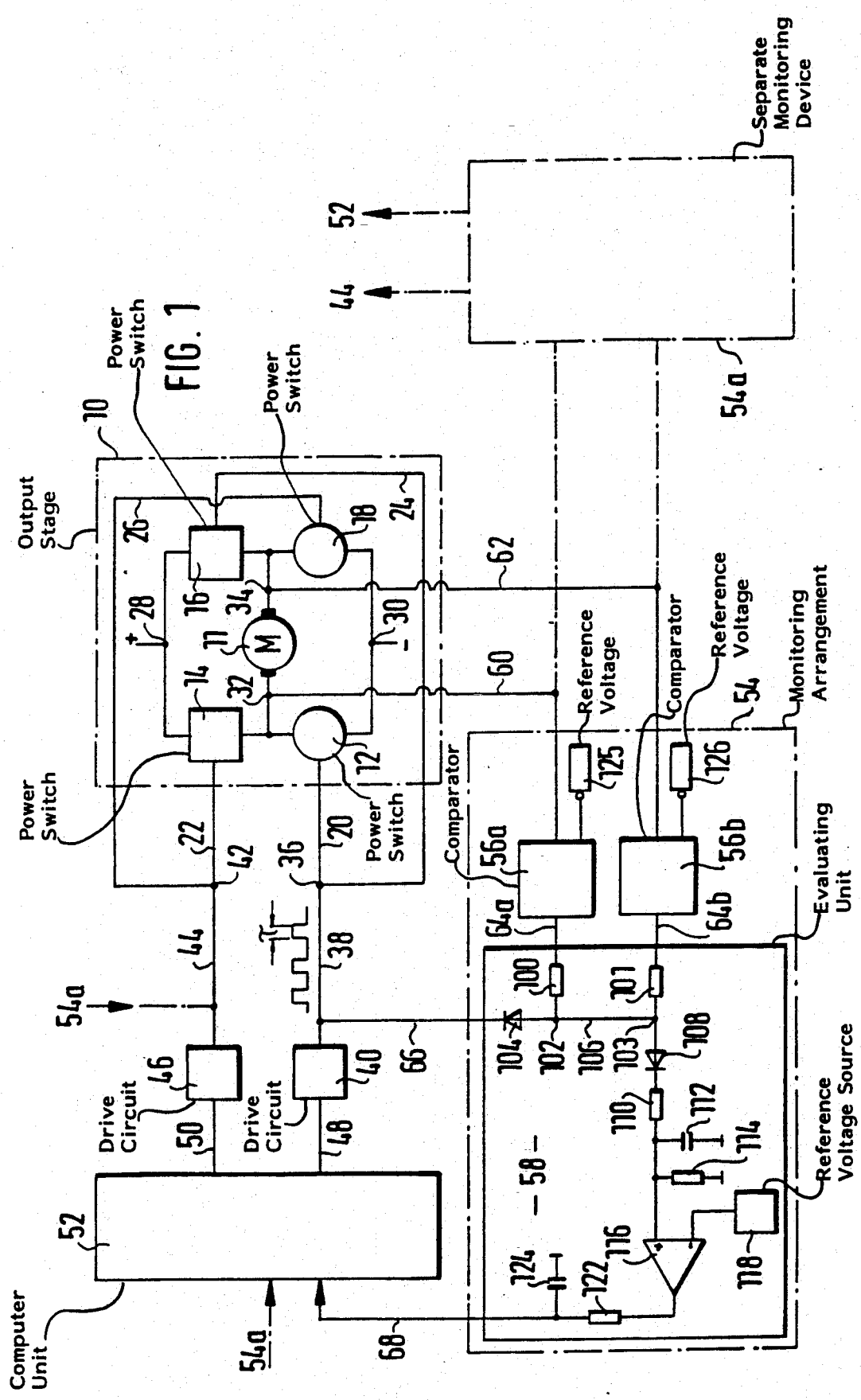
FIG. 1 shows a block diagram of an output stage with an embodiment of a circuit realization of the monitoring arrangement; and, FIG. 2 shows signal traces for a fault case under different conditions.

FIG. 1 shows an output stage 10 for controlling an electric drive 11 in combination with an internal combustion engine or a motor vehicle. The output stage is in the form of a bridge circuit with the electric drive 11 to be controlled being arranged in the diagonal of the bridge circuit. End stages of this kind are especially applicable for the open-loop control of the throttle flap of the engine in combination with engine control systems, such as an electronic accelerator pedal, idle speed closed-loop control or antislip closed-loop control.

The output stage comprises at least two power switches and in the embodiment shown the output stage comprises four electronic power switches (12, 14, 16 and 18) which are preferably MOSFET-transistors. These power switches are arranged together with other components in the form of a bridge circuit with the consumer (the electric drive) being preferably a position motor arranged in the bridge diagonal. One of the terminals of each of the power switches 14 and 16 is connected to a connecting node 28 to which the operating voltage U is applied. One terminal of each of the power switches 12 and 18 is connected to a connecting node 30 to which the negative pole of the operating voltage is applied. Furthermore, the second terminal of each of the switches 12 and 14 is connected to a common connecting node 32 to which a terminal of the electric drive is connected; whereas, the other terminal of the electric drive is connected to the connecting node 34 with the second terminal of each of the power switches 16 and 18. Drive signals are applied to the control inputs of the power switches 12, 14, 16 and 18 via lines 20, 24, 22 and 26, respectively.

The drive line 20 of power switch 12 and the drive line 24 of power switch 16 are connected together at connecting node 36. The connecting node 36 is, in turn, connected via line 38 to the drive circuit 40 for the forward direction of the electric drive with the drive circuit 40 being known per se. Likewise, the line 22 of the power switch 14 and line 26 of the power switch 18 are connected to connecting node 42 which, in turn, is connected via the line 44 to the drive circuit 46 for the rearward direction of the electric drive 11. The drive circuits 40 and 46 are connected via lines 48 and 50, respectively, to a computer unit 52 which determines the drive signal.

The computer unit 52 defines the electronic open-loop or closed-loop system in the application of the above-described engine control system. The electronic open-loop or closed-loop system determines the drive signal in dependence upon operating variables of the engine or of the vehicle for carrying out the open-loop and/or closed-loop control tasks.

The computer unit 52 supplies a drive signal via the lines 48 and 50 for the particular direction of the electric drive 11. This drive signal is preferably pulse-shaped with the pulse length, that is the pulse-duty factor $\tau$ of the pulse-shaped signal being variable. This pulse width then determines the duration of the switch-on phase of the particular power switch. The drive signal supplied by the computer unit 52 is processed in a known manner in the drive circuits 40 and 46 and then supplied via corresponding ones of the lines 38 and 44 to the particular power switch pair. The power switches 12 and 16 are closed at the same time in the case of a forward drive for the pregiven switch-on phase so that the operating voltage can be applied to the electric drive 11 so that current flows therethrough. In the case of a rearward control, the power switches 14 and 18 are correspondingly closed.

In a preferred embodiment, the power switches 14 and 16 are transistor stages having a circuit which permits the power switches 14 and 16 to be driven with control signals having a level less than the operating voltage. A control signal is preferably applied to the power switches 12 and 18 with this control signal having a level corresponding to the operating voltage. For this reason, symbols different from each other are used in FIG. 1.

In FIG. 1, a monitoring arrangement 54 according to the invention is provided for the above-described forward branch. A corresponding circuit 54a can also be provided for the rearward branch. This configuration is indicated by the block enclosed by the dash-dot line and corresponds in its configuration to monitoring arrangement 54.

Furthermore, well known measures (not illustrated) are included in the monitoring circuit in connection with the monitoring of the output stage and consumer which are well known from the state of the art. Such measures are for example provided for short-circuit protection.

The monitoring arrangement 54 essentially comprises comparator means 56a and 56b and an evaluation device 58. The comparator means 56a is connected via line 60 to the connecting node 32 of the electric drive 11 and the comparator means 56b is connected via line 62 to the connecting node 34. Accordingly, the potentials at the connecting nodes 32 and 34 of the electric drive 11 are applied to the comparator means 56a and 56b, respectively.

The line 64a connects the comparator means 56a to the evaluating unit 58 and line 64b connects the comparator means 56b also to the evaluating unit 58. The evaluating unit 58 is, in turn, connected via the line 66 to the drive line 38. The output of the evaluating unit 58 also defines the output of the monitoring unit 54 and is connected to the connecting line 58 which connects the evaluating unit 58 to the computer unit 52 and conducts an alarm signal in the event of a fault.

In the normal operation of the output stage and electric drive, the potential at the node 32 during the switch-in phase of the power switch is within a value range pregiven by the operating voltage and the voltage drop across the power switches 12 and 16 as well as across the electric drive 11. The potential at the node 34 during the switch-in phase of the power switch is within the value range pregiven by the operating voltage and the voltage drop across power switches 14 and 18 as well as across the electric drive 11. This value range is monitored by the comparator means 56a or 56b to which the potentials of the nodes 32 and 34, respectively, are applied.

A fault case can occur, for example, by an electrical and/or mechanical fault of the electric drive which leads to an increased current flow through the consumer, the electric drive. In the case of a fault, one or both of the potentials exceed or drop below the value range characteristic for normal operation. This exceeding or dropping below is checked by the comparator means 56a for the potential or connecting node 32 and by comparator means 56b for the potential or connecting node 34. For an analog realization, the comparator means comprise comparators generally known having pregiven reference voltages 125, 126.

In an embodiment shown, for a voltage drop characteristic of normal operation across the power switch 12 of 2 volts for the connecting node 32 for the forward drive, the check is made as to whether the potential is greater than a pregiven value lying in the region of 2 volts.

Correspondingly, and for the potential node 34, the check provides whether the potential is less than a value determined by the following: operating voltage, potential of node 32 and the voltage drop across the electric drive.

The comparator means 56a or 56b generate corresponding output signals when the detected potentials exceed or drop below the above-mentioned values.

The reverse situation is provided for the rearward direction. The connecting node 34 is monitored for the region of 2 volts or for the voltage drop across the power switch 18 while this switch is switched on while the potential node 32 is monitored for the value obtained from the operating voltage in correspondence to the description provided above.

This function can be carried out for the rearward direction in the separate monitoring device 54a.

The comparator means 56a and 56b supply the comparison result to the evaluating unit 58 via lines 64a and 64b, respectively.

In the above-mentioned application of an electronic accelerator pedal, a large drive signal magnitude $\tau$ in the forward branch indicates a wide open throttle flap, that is, a vehicle driving at a high load such as during an acceleration phase. A fault in the region of the output stage can in this operating condition lead to unwanted situations so that in this area, the fault condition has to be detected by switching out for example short-term voltage peaks as rapidly as possible and appropriate measures such as shut-off or emergency operation of the system have to be taken.

For a small drive signal, that is, a throttle flap opening at or near the idle region, the generation of an alarm signal can be delayed somewhat with respect to a large drive signal. This affords the advantage that shorter disturbances do not lead to a reaction of the system which, as a rule, causes a switch-off of the internal combustion engine or an emergency operation of the motor vehicle.

A similar situation is present for the rearward branch. A large drive signal magnitude means as a rule, for example in combination with drive-slip control systems, a rapid closure of the throttle flap which in the case of a fault can cause the engine to suddenly die and/or can cause mechanical damage in the area of the throttle flap. A fault condition for a large drive signal must therefore also be detected here as early as possible whereas for a small drive signal, the detection can take place somewhat later.

The measures described thereby increase the reliability and availability of the particular system.

The evaluating unit shown in FIG. 1 carries out the measures described. The output line 64a of the comparator means 56a is connected to resistor 100 while the output line 64b of the comparator means 56b is connected to the resistor 101. The other terminal of resistor 100 is connected to the connecting node 102 while the other terminal of resistor 101 is connected to the connecting node 103. In addition, at connecting node 102, the anode of a diode 104 is connected with the diode having a cathode connected to the connecting line 66. The connecting nodes 102 and 103 are connected with each other by line 106.

The anode of a further diode 108 is connected to the connecting node 103 with this diode having a cathode connected to a resistor 110.

The end of the resistor 110 lying opposite the diode 108 is connected on the one hand via the capacitor 112 to the negative pole of the operating voltage while, on the other hand, via a further resistor 114 to the negative pole of the operating voltage and finally to the positive input of an operational amplifier 116. The inverting input of the operational amplifier 116 is connected to a pregiven fixed reference value which is obtained from a reference voltage source 118. The output of the operational amplifier is connected to a resistor 122 having a resistor 124 connected at its opposite end to the negative pole of the operating voltage as well as to the connecting line 68 carrying the alarm signal.

Figure 2:
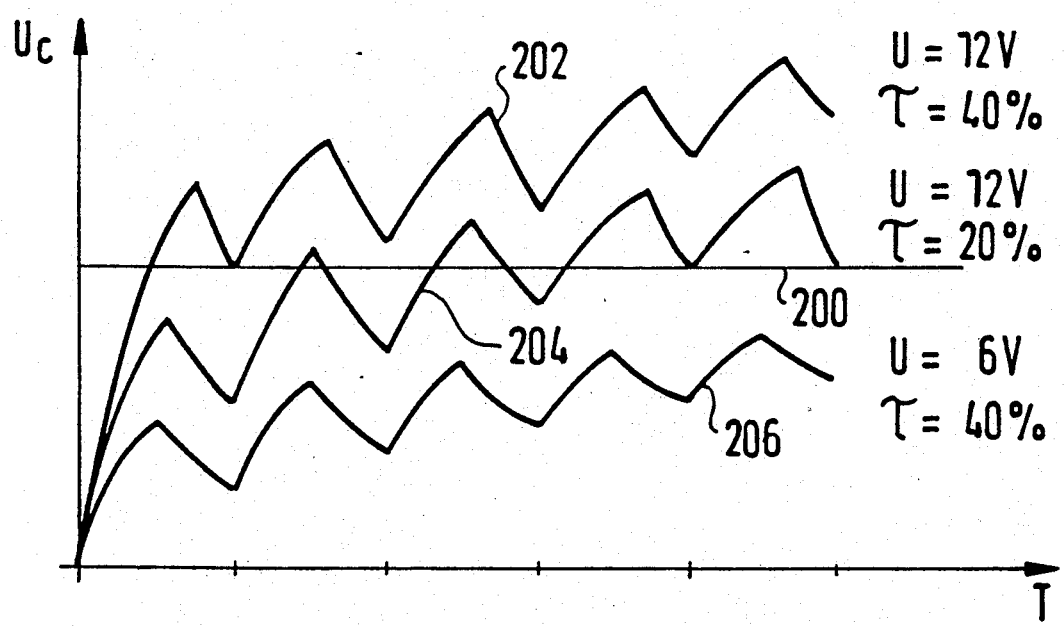

The operation of the circuit described is explained in the following with the aid of the time diagram of FIG. 2. In FIG. 2, the horizontal axis defines the time axis while voltage values are indicated on the vertical axis.

A fault condition occurs when the potentials at the nodes 32 and/or 34 exceed or drop below the pregiven values. In such a fault case, the comparator means 56a and 56b generate fault signals on lines 64a and 64b, respectively, which charges the capacitor 112 for the duration of the switch-in phase or drive phase via the respective resistors 100 and 101, diode 108 and the resistor 110. The diode 104 blocks during the switch-in phase so that the capacitor 112 is charged during the drive phase $\tau$ when there is a fault signal.

A double fault occurs when there is a fault condition in the area of the potential node 32 as well as 34. In this case, the condenser 112 is charged with the double current.

During the switch-off phase of the power switches 12 and 16 that is for rearward drive, the comparator means 56a and 56b detect a fault condition likewise for the forward branch. This however, does not lead to the generation of an alarm signal since in this case, the diode 104 is switched through whereas the diode 108 is blocked. The current flowing through the diode 104 is absorbed in the drive circuit 40.

A current flow to capacitor 112 is no longer possible because of the reasons mentioned above. The capacitor 112 therefore discharges itself via resistor 114 during the switch-off phase of the power switches.

An alarm signal on the line 68 is generated by means of the capacitor voltage when exceeding the switch-off threshold which is pregiven by the constant reference voltage of the reference voltage source 118.

The same applies to the rearward branch.

The comparator means 56a and 56b are preferably realized as analog comparators configured as operational amplifiers connected to the operating voltage. With this realization, the additional advantage is afforded that in special operating conditions such as for starting operation when the operating voltage of the output stage drops and a fault announcement takes place via the comparator means, the capacitor is charged only until the maximum value dependent upon the operating voltage is reached, the predetermined reference voltage is not exceeded and thereby no alarm signal is generated.

In FIG. 2, reference numeral 200 identifies the reference switch-off voltage threshold. During operation of the motor vehicle when the operating voltage of the output stage as a rule is 12 volts, a switch-off signal is generated in dependence upon the magnitude of the drive signal and is time delayed when a fault signal is present when the switch-off voltage is exceeded. For a large drive signal, for example $\tau=40\%$, the capacitor voltage on capacitor 112 has the trace shown in FIG. 2 with numeral 202. During the switch-on phase of the power switches, the capacitor is charged and the capacitor voltage exceeds already during the first drive period the switch-off threshold and generates thereby an alarm signal.

The arrangement according to the invention then generates an alarm signal when the potentials of the terminals of the consumer take on values not characterizing the normal operation. This alarm signal is generated after a pregiven time delay dependent upon the magnitude of the drive signal after the fault condition is detected.

The time trace for lower drive signal magnitudes, for example $\tau=20\%$, is shown by curve 204. In this case, the capacitor voltage reaches the switch-off voltage only within the second drive period and thereby generates an alarm signal. In this way, short-term disturbances are effectively eliminated in this region. A special operating condition of the engine takes place for example during the starting operation wherein the operating voltage drops below its nominal value of 12 volts for example down to 6 volts. In such special operating conditions, the evaluating unit described above does not generate an alarm signal which would be wanted in this undefined operating condition. The capacitor becomes charged maximally to a maximum value dependent upon operating voltage so that for operating voltages of for example 6 volts, the switch-off threshold is not reached. This is shown in FIG. 2 with respect to the drive magnitude $\tau=40\%$ by the time trace 206.

Double faults occur when the potential at node 32 as well as at node 34 exceeds or drops below pregiven values. For such double faults, the fault signals are added at node 103 so that in this case, the generation of the alarm signal takes place faster than when single faults are present.

From the above, it can be seen that the monitoring unit time-delays an alarm signal when a fault is present when the potentials of the terminals of the consumer during a pregiven time duration do not assume the values characterizing the normal operation. The alarm signal is generated in dependence upon the magnitude of the switch-on phase, that is of the drive signal, and thereby reacts flexibly to the particular operating condition of the consumer or the output stage.

The procedure defined by the invention is applicable in an advantageous manner also in combination with the control of a diesel injection pump.

A realization of the procedure described above can likewise be advantageous in the form of a computer program.

It is understood that the foregoing description is that of the preferred embodiments of the invention and that various changes and modifications may be made thereto without departing from the spirit and scope of the invention as defined in the appended claims.

What is claimed is:

1. An arrangement for monitoring a consumer in combination with an internal combustion engine and/or a motor vehicle, the arrangement comprising:

an output stage configured as a bridge circuit having at least two power switches and defining bridge terminals of a bridge diagonal;

said consumer being connected to said terminals to extend across said bridge diagonal;

drive circuit means for generating and applying a drive signal to said output stage for driving said consumer;

said bridge circuit having circuit nodes whereat potentials in said bridge circuit and/or on said consumer can be monitored;

a monitoring apparatus for monitoring the operation of said output stage and/or said consumer, the monitoring apparatus including:

comparator means connected to said circuit nodes for monitoring the respective potentials at said circuit nodes with respect to pregiven value ranges for determining a fault condition and providing a comparator signal indicative of the fault condition;

evaluator means connected to said comparator means for receiving said comparator signal and connected to said drive circuit means for monitoring said drive signal; and, said evaluator means being adapted to evaluate said drive and comparator signals and, in the event of a fault condition, generate an alarm signal in dependence upon the magnitude of said drive signal.

2. The arrangement of claim 1, wherein said consumer is an electric drive in combination with an electronic gas pedal system.

3. The arrangement of claim 1, said evaluator means being further adapted so as to issue said alarm signal with a time delay.

4. The arrangement of claim 3, said time delay being dependent upon said magnitude of said drive signal with said time delay being less for an increase in said magnitude.

5. The arrangement of claim 1, wherein said drive signal is pulse-shaped and said power switches each have switch-on and switch-off phases.

6. The arrangement of claim 5, said evaluator means including: a capacitor for receiving a charge from said comparator means during said switch-on phase of at least one of said power switches in the event of a fault condition; and, a resistance element for discharging said capacitor during the switch-off phase of said power switch.

7. The arrangement of claim 6, said comparator means being adapted to generate an alarm signal when the voltage across said capacitor exceeds a preset reference voltage.

8. The arrangement of claim 1, said comparator means being adapted to detect a fault condition when there is an overcurrent in the region of the consumer and at least one of the monitored potentials does not lie in the value range characterizing normal operation for a predetermined time duration.

9. The arrangement of claim 5, said drive circuit means and power switches being interconnected by respective drive lines; said comparator means having an output connected to said evaluator means and said evaluator means including a diode connected between one of said drive lines and said output of said comparator means so as to cause said diode to be switched into its blocking direction during said switch-on phase when said alarm signal is present.

10. The arrangement of claim 6, said comparator means including two comparators having respective outputs connected to each other at a common connecting node; and, said capacitor being connected to said common connecting node.

11. The arrangement of claim 1, wherein said consumer is an idle speed closed-loop control.

12. The arrangement of claim 1, wherein said consumer is an anti-slip closed-loop control.

* * * * *